March 22, 1966  R. NOUEL  3,241,816
FORCE MULTIPLYING DEVICE
Filed April 15, 1963  3 Sheets-Sheet 1

INVENTOR
Robert Nouel
BY Theodore Bishoff
ATTORNEY

March 22, 1966 R. NOUEL 3,241,816
FORCE MULTIPLYING DEVICE
Filed April 15, 1963 3 Sheets-Sheet 2
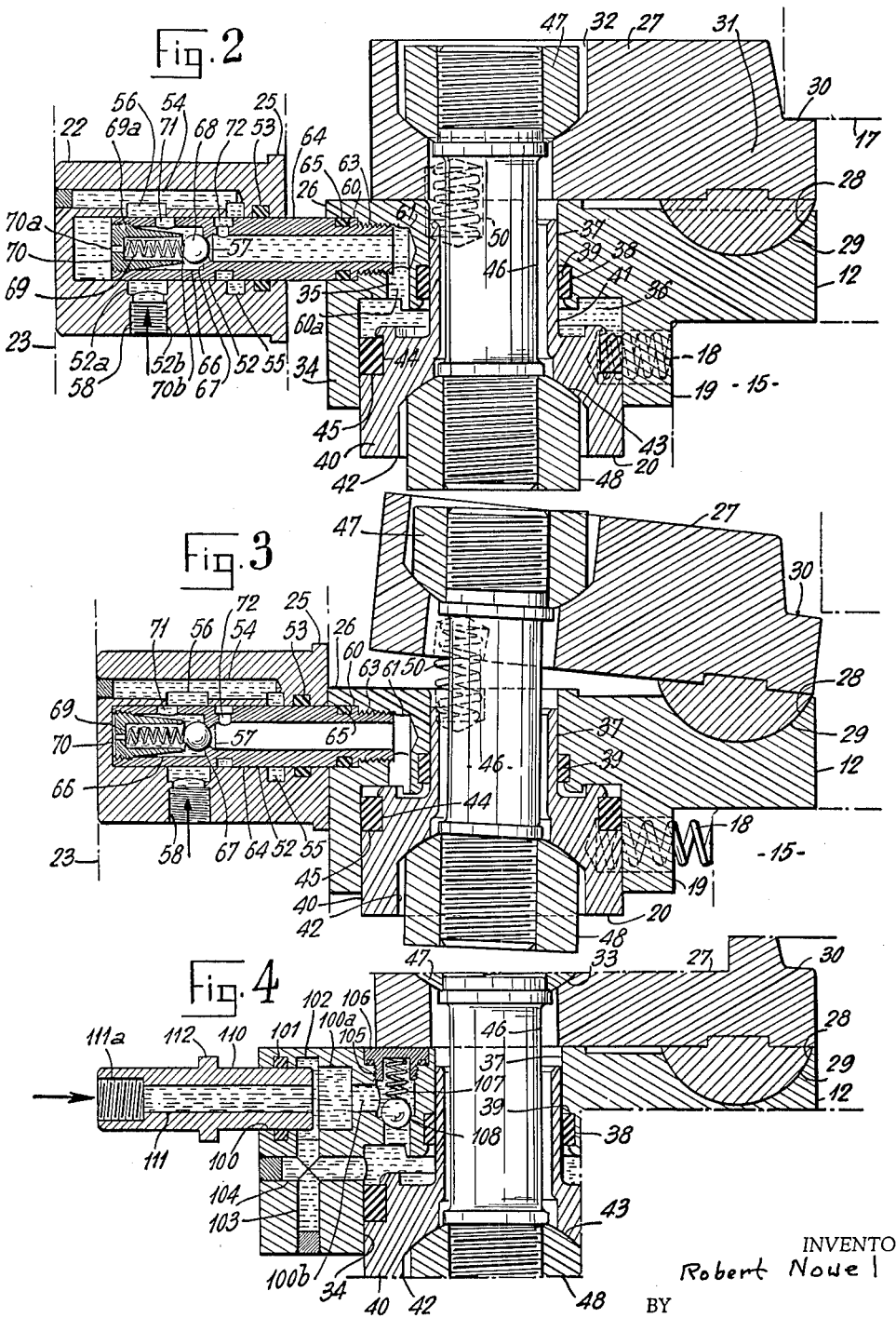
INVENTOR
Robert Nouel
BY
Theodore Bischoff
ATTORNEY March 22, 1966  R. NOUEL  3,241,816
FORCE MULTIPLYING DEVICE
Filed April 15, 1963  3 Sheets-Sheet 3
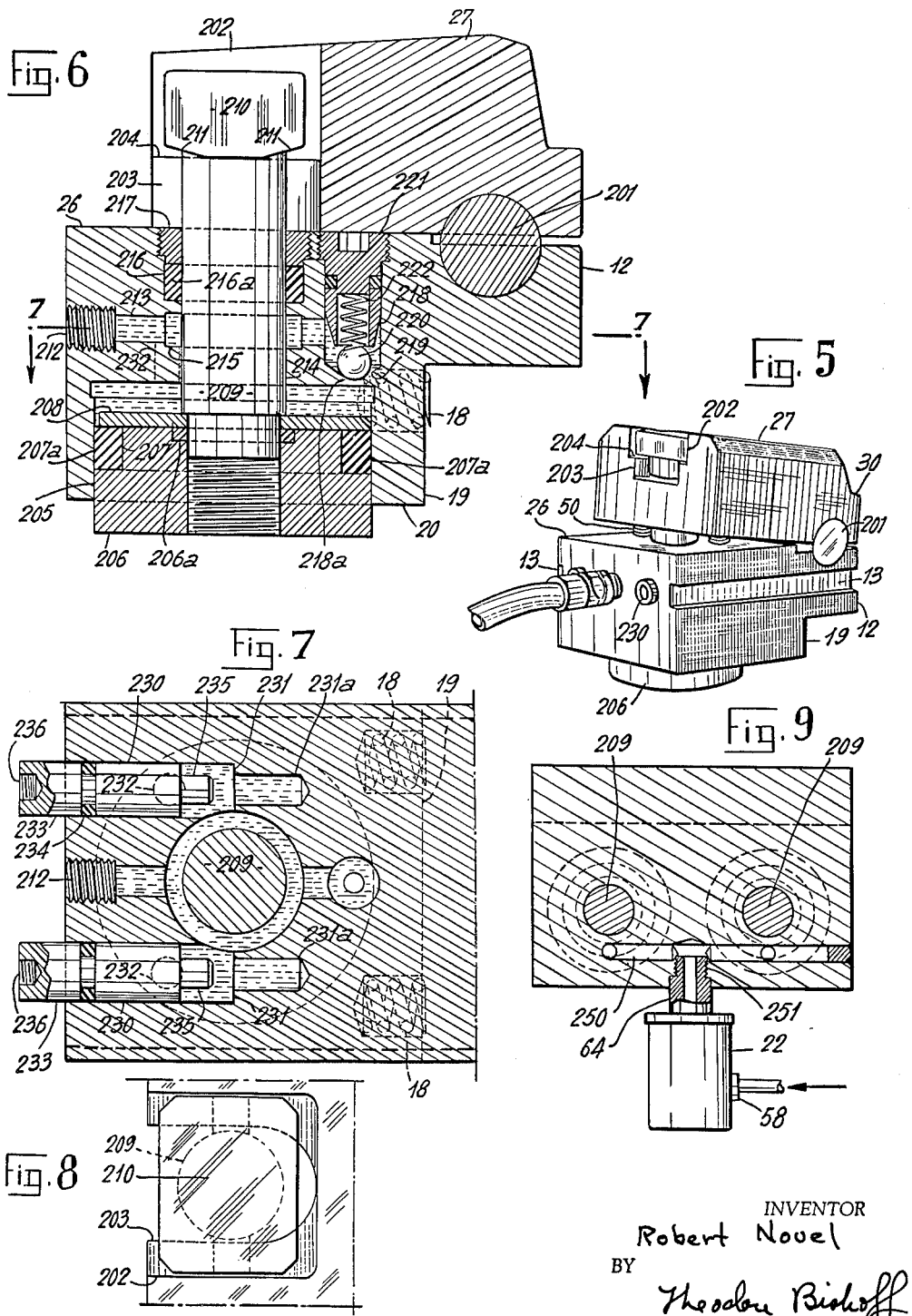
INVENTOR
Robert Nouel
BY
Theodore Bishoff
ATTORNEY

United States Patent Office 3,241,816
Patented Mar. 22, 1966

3,241,816
FORCE MULTIPLYING DEVICE
Robert Nouel, Villejuif, Seine, France, assignor to Inventions Finance Corporation, New York, N.Y., a corporation of Delaware
Filed Apr. 15, 1963, Ser. No. 273,241
22 Claims. (Cl. 254—93)

This invention is an improvement upon the structure illustrated and disclosed in my prior applications Serial Nos. 173,103; 187,480 and 206,508, filed February 13, 1962; April 16, 1962 and June 29, 1962, respectively, of which it is a continuation-in-part, and relates to hydraulically actuated devices for applying substantial forces and thrusts against objects that require such forces or thrusts to be applied thereto in operation thereof. Such forces are used, for example, in pressing together parts for fixed clamping thereof during the performance of certain operations on or with the parts; the parts, by way of example, being separable mold parts or the like.

Consistent with the terminology used herein, such devices, as illustrated in my aforesaid prior application, comprise a relatively fixed support means, a movable support means mounted on the fixed support means, a lever member as means fulcrumed on the movable support means for movement therewith and pivotal movement with respect thereto, and a piston means cooperating between the lever means and the movable support means to pivot the lever means in force multiplying relation about the fulcrum. The cooperation between the piston means and the lever means is achieved through a piston rod arrangement, and the piston is actuated or controlled by hydraulic fluid under pressure entering channels within the movable support means and passing into a piston chamber forming part thereof. The piston rod arrangement includes an actuating piston rod extending through a bore in the movable support means and engaging one end of the lever means.

In devices of this character, constructed as described above, it has been found that as the hydraulic pressures fed to the piston means are increased to produce greater and greater forces and thrusts, by and through the lever means, a large transverse force is developed on the end of the piston rod causing it to tend to bind in the bore of the support means. The linear motion of the end of the actuating piston rod as compared with the slight arcuate movement of the cooperating end of the lever means resulting from the pivoting provides a slight but perceptible transverse motion of the end of the actuating piston rod. In the operation of the device at lower pressures and with attending lower forces and thrusts, the slight arcuate motion of the end of the lever means with respect to the cooperating end of the piston rod presents no problem because there is a certain amount of compensating sliding motion between the cooperating ends of the piston rod and the lever means. However when higher pressures are approached and with the attending increased forces acting in the connection between the cooperating ends of the lever means and piston rod, the generally compensating sliding motion can not take place. Consequently, a large transverse thrust can be exerted on the end of the piston rod in question which causes it to bear more against one side of the bore through which it extends in the movable support means than the other. This results in binding and uneven wear, and in turn limits the effectiveness and efficiency of the device, as well as certain operating characteristics thereof.

In some environments of use, it is essential that the parts of devices such as described operate quickly and with almost instantaneous application of the force or thrust. The quickness of the operation depends on the rapidity with which the hydraulic fluid can be transferred within the device to the piston means so as to actuate the piston rod thereof. This in turn depends on the arrangement, size and shape of the passages in the support means which communicate with piston means for the application of hydraulic fluid thereto. The fewer and the shorter the passages, and the more directly they communicate with the piston means, the shorter will be the time interval required for operation of the piston means, resulting actuating of the piston rod, and resulting force multiplying movement of the lever means. The simplicity of the hydraulic circuit also operates to reduce the number of machine operations required in the manufacture of the device, and thus reduces the manufacturing costs, making the device available for an ever increasing utilization.

It is an object of the present invention to provide an improved force multiplying structure conforming with the above described constructions basically but designed to apply increased thrusts, and to eliminate the limiting effect of the arcuate motion of the lever means with respect to the actuating piston rod cooperating therewith. Specifically, it is an object of the invention to eliminate binding and attending wear due on the actuating piston rod within such a structure which results from the arcuate motion of the lever arm, with respect to the actuating piston rod and which is particularly prevalent when high pressures are used to create high forces and thrusts through use of the device.

Another object of the invention is to provide a simplified hydraulic system within a structure as described above, which system reduces the length and complexity of the fluid passages to provide a more direct communication between a fluid supply and the piston means of the structure so as to yield more rapid actuation than that which has previously been achieved.

Still another object of the invention is to reduce the number of machine operations that must be performed in the manufacture of a structure or device of the type in question so as to thereby reduce the cost of the manufacture of the device, and provide for increased reliability thereof.

Still other objects of the invention and advantages achieved therewith will become apparent from consideration of the following more detailed explanation of the invention. Such explanation refers to the accompanying drawings, wherein:

FIGURE 2 is an elevational view, in section, and disclosing one embodiment of the invention with the parts thereof in the extended or force or thrust applying position;

FIGURE 3 is an elevational view, in section, similar to FIGURE 2, and disclosing one embodiment of the invention with the parts thereof in retracted non-thrust applying position;

FIGURE 4 is an elevational view, in section, showing a modification of the hydraulic system provided hereby for moving the movable support means of a device constructed in accordance herewith between the retracted and extended positions of the support means;

FIGURE 5 is a perspective view of another modified form of movable support means included in a thrust applying device constructed in accordance herewith;

FIGURE 6 is a sectional elevational view of the movable support means shown in FIGURE 5;

FIGURE 7 is a sectional view taken along 7—7 of FIGURE 6;

Figure 1:
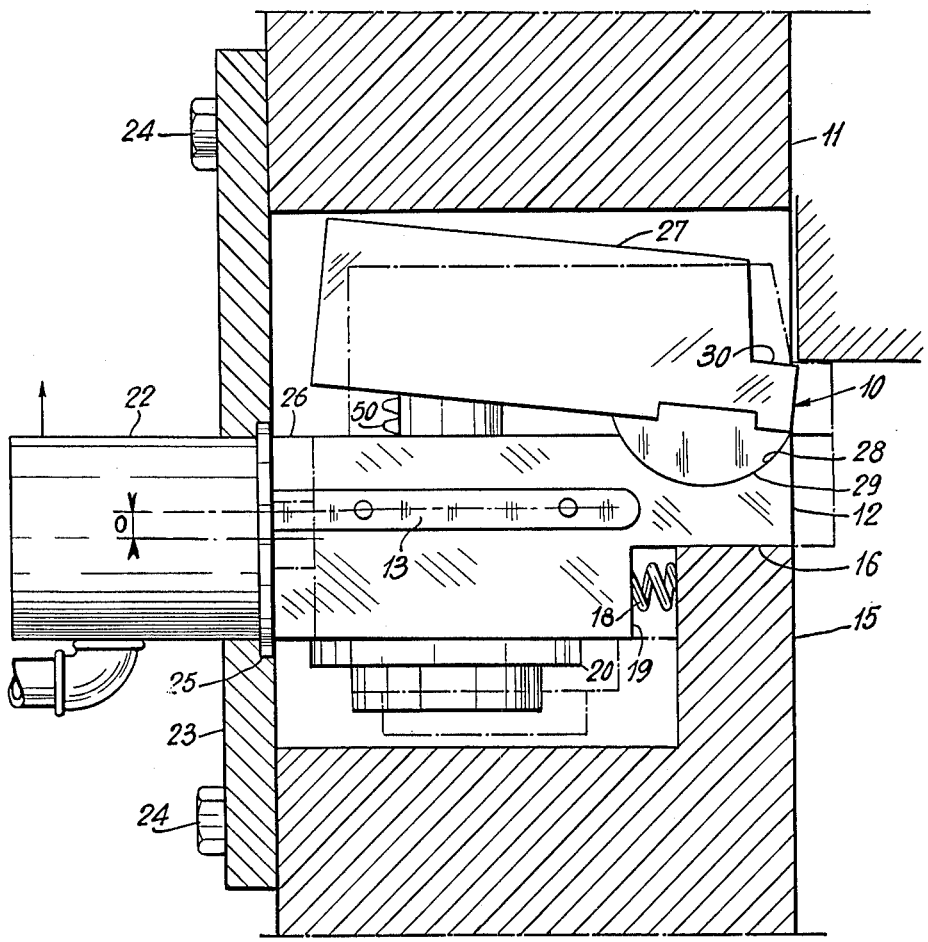
FIGURE 1 is an elevational view, partly in section, showing the device in non-operative relation with a fixed supporting structure or base.

FIGURE 8 is a fragmental plan view of the end of the lever arm in the region of its connection with a piston rod, as associated in a device constructed in accordance with this invention; and FIGURE 9 is a fragmental sectional view of a further modified embodiment of the invention, wherein a pair of pistons and cylinders are utilized for the actuation of the lever means, as opposed to a single piston-cylinder arrangement.

Referring to FIGURE 1, the force or thrust producing device 10 is arranged in relation to a fixed support means 11 for slidable motion transverse thereto and to the direction of the force or thrust that is to be applied. The fixed support means 11 can be a part that is affixed to the machine with which the device is to be used, or it can be a part of the machine designed to receive the device 10. The fixed base needs only be rigid and immovable once moved to its operative supporting position, and it should be strong enough to resist deformation under the tremendous forces that are to be exerted through the lever means associated therewith.

The device 10 comprises a movable support means 12 provided on opposite sides with longitudinally extending rectangularly shaped grooves 13, only one of which appears in the drawing. The grooves 13 cooperate with longitudinally extending and laterally projecting tongue members, not shown, that are formed integral with or affixed to the side walls 14 of the recess in the fixed support means 11, whereby the tongues cooperate with the grooves to partially support the support means 12 for reciprocal movement within recess 14. The recess formed by the side walls 14 has a stepped floor providing an upstanding portion 15 having an upper end which serves as a bearing surface 16 on which movable support means 12 is further partially reciprocally supported. This surface 16 receives the bulk of the reaction forces as explained below.

The movable support means 12 is arranged for limited transverse motion in the recess 14 from a retracted position, as shown in FIGURE 1, to an extended position wherein the movable support means projects from the recess 14 and fixed base means 11 into a position beneath the body 17 against which the force or thrust is to be applied. The transverse motion of movable support means 12 in the direction towards its extended position is limited by the upstanding portion 15 of the fixed support means.

The movable support means 12 is moved between its retracted position and its extended positions by hydraulically actuated means reacting to hydraulic pressure that creates a force on a piston of the hydraulic means in a cylinder thereof to propel the movable support means 12. This action overcomes the biasing action of a spring means 18 interposed between the upstanding portion 15 of the fixed support, and the front face 19 of depending portion 20 of the movable support means 12.

In FIGURE 1 the piston is connected to the movable support means 12 and projects into a cylinder 22 supported by a cover member 23 that closes the back of the recess. The cover member 23 is retained against the fixed support means 11 by any suitable means such as, for example, the bolts 24 passing through the cover member 23 and screw threaded into the fixed support means 11, as shown.

Preferably, the cylinder 22 is provided with a cylindrical exterior having a flange 25 at one end thereof, and this flange fits into a counterbore of the cover member 23 to limit the rearward motion of the cylinder and to receive the thrust exerted between the piston and cylinder incident to pressure acting in the cylinder against the piston. The cover member 23 further acts as an abutment limiting the transverse motion of the movable support means 12 into its retracted position under the action of the spring means 18.

The movable support means 12 is provided with an upper surface 26, that pivotally supports a forcing or thrusting lever means 27. The end of the surface 26 near the open end of the recess is provided with a semi-cylindrically shaped transversely extending groove 28, which groove supports and receives a cylindrically shaped segment 29 depending in attached or integral relation, as desired, from the forward end of the lever means 27. This cylindrical recess and segment cooperatively provide a pivot means or fulcrum means having a substantial bearing surface over which the reacting force is distributed in operation of the device hereof.

The lever means 27 is provided on its forward end with a stepped portion forming a surface 30 extending in a plane passing through the effective pivot axis 31 of the lever means 27. This surface is disposed in forward extending relation to the axis 31 and functions as a means on the lever for engaging the body against which the force or thrust is to be applied. The surface 30 faces upwardly to engage the underside of the body 17, as illustrated. The upward facing direction is, however, only relative, and is dependent on this disposition of the device and body that is to receive the force or thrust.

Rearwardly of the pivot axis 31, and substantially in the common plane of the pivot axis 31 and of the surface 30, the lever means 27 is connected to the hydraulic means which acts to pivot the lever about its pivot axis to apply the force or thrust through the engagement of the surface 30 with the body 17.

Reference is now made to FIGURES 2 and 3 for a detailed description of one embodiment of a device constructed in accordance with the invention.

To alleviate the binding stresses and the binding effect referred to above that produce abnormal wear in the bore of the movable support means and on the actuating piston rod of prior units, the present invention contemplates modifying the structure by which the lever means and piston means have been connected. The modification is such as to permit a transverse motion of the connection to the lever means in a manner that precludes binding of the actuating piston and/or its associated actuating piston rod against the walls juxtaposed relative to these elements. With the modifications the maximum utilization of the hydraulic fluid pressure is achieved and the pressure produces the maximum force or thrust without being wasted in overcoming interfering binding forces. Also the unequal wear problem referred to above is obviated by the modifications made in accordance herewith thus prolonging the life of devices incorporating the modifications hereof.

The modified structure incorporates in the right hand end of the lever, or the end portion of the longer arm thereof, a counterbore 32 which is joined with the actuating piston rod 46 by a shoulder 33, disposed on the upper end of rod 46, such shoulder being provided with a spherically shaped lower surface.

In underlying relation to the counterbore 32 in the lever arm 27, when the same is in its lower pivoted position, the movable support means 12 is formed with a counterbore 34, having a transverse shoulder 35 providing the bottom thereof. The shoulder 35 is located at the junction between a first piston cylinder 36 and a bore 37 through which an actuating piston rod can freely slidably extend. The rod bore 37 has an internal inwardly opening annular groove 38 therein which carries conventional hydraulic packing therein which slidably engages a sleeve extension 41, described more fully below, to prevent hydraulic fluid from leaking from first piston cylinder or chamber 36.

A first piston 40 integrally formed with a sleeve extension 41, has a peripheral diameter dimensioned to slidably fit into the bore forming cylinder 36. The sleeve extension 41 is similarly slidably received in connecting bore 37 for sliding sealed movement therein with respect to hydraulic packing 39. The first piston 40 and its integral sleeve extension 41 are also counterbored at 42 to form a shoulder 43 having a spherical surface of the same radius as that formed on the shoulder 33 in the counterbore 32 on the lever, the counterbore 42 being coaxial with counterbore 32.

For best results the radii of the spherical surfaces of the shoulders 33 and 43 should be equal to the length of the connecting means between the shoulders. Such a radius provides for easy pivoting of the connecting means at each of the shoulders.

The piston 40 is preferably further provided with an annular groove 44 which supports a hydraulic packing ring 45, the packing for ring 45 functioning to prevent leakage along the piston 40 to the exterior of the device.

Housed in and operating within the counterbore 42 of the piston 40 and its integral sleeve extension 41 and extending into the counterbore of the lever 27 is a link member 46, such member effectively serving as the actuating piston rod. The upper and lower ends of the link member 46 are threaded for the threaded reception nut-like members 47 and 48 on the upper and lower ends respectively. The lower surfaces of the members 47 and 48 have spherical shaped surfaces complementing the surfaces of the shoulders of the lever and the piston on which they are seated so as to thereby form a ball and socket joint. Such a connection between the lever and the above described piston provides for a limited amount of transverse motion of the link 46 about either of its ends in all directions, and thus removes the limiting effects of arcuate motion of the end of the lever with respect to the normal linear motion of the piston. The link member 46 has a diameter sufficiently smaller than the inner diameter of the bore extending through sleeve extension 41 to permit ample room for limited pivotal motion of the link in operation of the device.

As in the devices disclosed in my aforesaid prior application lever 27 is normally urged towards its upper pivotal position by a biasing means comprising one or more biasing springs 50 having their ends set in oppositely disposed one-ended recesses opening on the lower face of the lever 27 and the top surface 26 of the movable support member 12, respectively.

The movable support means is further provided with an open ended recess in the lower front face 19 thereof, which recess receives the end of spring 18. The other end of the spring 18 is received in a like recess in the rearwardly facing wall of the upstanding portion 15 of the fixed support means, whereby spring 18 acts as a biasing means normally urging the movable support means to its retracted position. The spring or springs 50 preferably have a greater biasing or reacting force than the spring or springs 18 so that the spring or springs 50 will move the lever 27 to its non-thrusting position before the spring 18 returns the movable support means to its retracted position.

For moving the movable support means 12 towards its extended position, toward the right shown, the fixed support means 11 carries a cylinder member 22 providing a uniform cylindrical bore 52 extending from a rear wall disposed in spaced parallel relation to the left end of the support means to and through its opposite end. An annular groove 53 housing a hydraulic packing is provided in the wall of bore 52 adjacent the open end thereof. The cylinder member 22 is provided with an additional bore 54 extending parallel to bore 52 from the closed or left end thereof to a position rearwardly closely spaced from the hydraulic packing in recess 53. The forward or inner end of bore 54 connects or communicates with bore 52 through a second annular groove 55 in the wall of bore 52. The groove is disposed in rearward closely spaced relation to the packing recess 53 and is specifically located at the forward terminal end of bore 54. The rear end of the bore 54 which because of the forming thereof is normally open, is closed by a plug fixed in such open end to close the same, as by welding of screw threading.

Intermediate the ends of the main cylinder bore 52, an inlet passageway 52a is provided, such passageway preferably being formed as an enlarged inwardly opening peripheral recess in bore 52. The passageway communicates with the small axially parallel bore 54 and with a threaded supply inlet coupling portion 58. The threaded supply inlet coupling 58 can be easily connected to a source of pressurized hydraulic fluid that is controlled for selective feed to the device. The supply can vary widely in type, and forms no part of the present invention.

To comprehend the invention, it is sufficient to understand that the supply, regardless of type used, serves to deliver fluid under pressure to inlet coupling 58, and to permit the drain of fluid therefrom, in a manner selected by the operator.

Again referring to the hydraulic system included within a device constructed in accordance herewith, and particularly FIGURE 2, it will be noted that the movable support means 12 is provided with a stepped bore 60 in the end thereof adjacent cylinder member 22; i.e., in its left end as shown, the end opposite the open end of the cylinder 22. The stepped bore 60 extends parallel to the first piston cylinder chamber 36 which slidably receives the first piston 40. However, stepped bore 60 communicates with chamber 36 through transversely extending connecting bore 60a. In the smaller outer portion of the stepped bore 60, peripheral threads 63 are provided, and these threads receive reduced end portion, or right end portion, as shown, of a second piston 64, which as explained more fully below, is a valve-type piston. Second piston 64 is provided with an annular groove 65 adjacent the reduced end portion thereof, and this recess receives a packing which bears on the inner periphery of bore 60 to seal against leakage of the hydraulic fluid along the threads and exteriorly of the piston 64.

Further the second piston 64 is provided with a counterbore 66 extending inwardly from the outer end (left end, as shown) of piston 64 and terminating in a shoulder 67. Shoulder 67 extends transversely through the piston and divides the same into fluid receiving and fluid transmitting sections. The shoulder 67 is shaped centrally thereof to form a valve seat for the centrally disposed ball 68. The ball 68 is urged against the seat in shoulder 67 by a spring 69. Spring 69 is supported in and extends from a recess 69a in an apertured plug 70. Plug 70 is threaded into the normally open end of the piston 64, but does not close the same. The plug 70, in particular, has an aperture 70a in the end thereof, and is incorporated primarily to support spring 69 so that the same normally causes ball 68 to sit on the centrally disposed seat in shoulder 67. As a secondary function, the inner end 70b of plug 70 provides a rearward seat for ball 68, thereby preventing the ball from dropping out of position during operation, while at the same time permitting small axial movement of the ball between a first position where the ball closes the shoulder 67, or specifically the central opening therein, to a position where the ball is slightly spaced from such opening to permit fluid transfer between opposite sides of shoulder 67.

The interior of the left end portion, or fluid receiving section, of the piston 64 communicates through a port 71 therein continuously with the registering annular groove 56, and thereby with the inlet coupling 58. The space within the piston to the right of the shoulder 67; i.e., the fluid transmitting section of piston 64 communicates with the fluid receiving section thereof through the ball valve formed by shoulder 67 and ball 68, such valve, being effectively a check valve. The fluid transmitting section of piston 64 further communicates through a port 72 located adjacent the check valve 68 with the peripheral exterior of the piston 64.

When the apparatus is in the position shown in FIGURE 3, hydraulic fluid under pressure, when admitted to the inlet coupling 58 passes through the annular groove 56 and registering port 71 into the fluid receiving section of the counterbore within the piston 64; i.e., into the portion thereof to the left hand side of the ball check valve 68. The fluid then passes out through the aperture 70a in plug 70, and into the closed space behind the piston 64. This results in propelling the piston 64 toward the right as shown; i.e., to the fluid transmitting position thereof. As a result of the movement of piston 64, the movable support means 12, which is connected with the piston, moves from its retracted position to its extended postiton and the surface 30 is therby positioned in a thrusting position under the body 17 that is to receive the applied force or thrust. Here, it should be reminded that the support or base means 11 is fixed at the time of the operation here in question, and the cylinder of chamber member 22 is accordingly also fixed. Thus, the reaction of the hydraulic fluid under pressure between the inner rear face of the cylinder member and the piston 64 moves the piston and thereby the movable support means connected with the piston 64 through the threaded coupling 63 therebetween. The action of the movable support means is against the force of the spring 18, but such spring becomes compressed in the operation and thereby conditioned to apply a return force to the movable support means when the pressure of fluid at the inlet coupling 58 is relieved.

As the movable support means approaches the end of its travel into its extended position, communicating the fluid transmitting section of piston 64 with the perihpery thereof, the port 72 comes into registry with the fluid transmitting groove 55, and the hydraulic fluid fed into coupling 58 is directed through the parallel auxilary bore 54, groove 55, and port 72 to the interior of the fluid transmitting section of piston 64 to the right of shoulder 67 and the check valve 68. The fluid flows through and from the piston 64 into stepped bore 60 and then through the transverse bore or passage 60a into the chamber 36 which receives the first piston 42. The hydraulic fluid flowing into the chamber 36 space forces the piston 42 downwardly, as shown, to an actuating position, where the lever 27, through the action of link 46 and fulcrum mountings 28 and 29, is caused to pivot relative to the upper surface 26 of the movable support means and to apply a force or thrust against the underside of the body 17 that is positioned to receive the thrust.

After the need for the application of the force or thrust no longer exists, the pressure of the hydraulic fluid is released and the fluid is allowed to flow back towards the source. The pressure on the inlet, or left hand side of the check valve ball member 68 as shown, is reduced by reason of the release of the pressure at the inlet coupling 58, and the fluid from cylinder 34 flows back through the passage 60a, the internal bore of the second piston, through the central opening in shoulder 57, port 71, annular groove or passageway 52a, and to inlet coupling 58. The fluid is forced to flow in the return path since the spring 50, acting through the piston rod or link 46, moves the piston 42 inwardly against the hydraulic fluid in chamber 36, or specifically toward shoulder 35. When the first piston 42 reaches the inward end of its stroke, it no longer creates a pressure on the fluid in chamber 36, and the ball member 68 moves into closing relationship with the opening in shoulder 57 thereby causing the check valve formed thereby to close.

Thereafter the spring 18 imposing a biasing force on the moveable support means forces the second piston 64, inwardly of its cylinder 22, and forces the fluid in the end space 69a between the end of the plug 70 and the cylinder end wall, out through aperture 70a in plug 70, the open end of plug 70, port 71, annular groove or passageway 52a, and inlet coupling 58. The amount of fluid displaced by the main or first piston 42 and auxilary or second piston 64 is the only fluid that is returned to the source of fluid pressure since this was the only fluid displaced during the actuating operation. The system otherwise remains full of hydraulic fluid thus ready for the repetition of the working cycle of the device described above.

An alternate embodiment of the present invention is shown in FIGURE 4. Specifically, this modification incorporates a slightly different hydraulic system for actuating the moveable support between its retracted and extended positions. Consistant therewith in this instance, the moveable support means 12, is formed with a lateral second bore 100 opening to one side of the moveable support means 12 and having a first annular groove 101 peripherally therein, such groove 101 receiving therein a hydraulic packing. Bore 101 extends past a second or intermediate annular groove or peripheral passageway 102. The second annular groove or passageway 102 is connected in fluid communicating relationship to a vertical passage 103, formed by an upward and inward bore extending through the bottom surface of the support means 12, and through a horizontal passageway 104, formed by a laterally and inwardly extending bore traversing the side wall of support means 12. Bore 104 is in direct communication with first cylinder 34 above the first piston 40. The end of the second cylindrical bore 100 communicates through intermediate passageways 100a and 100b with a vertical counter-bore 105 leading downwardly into cylinder 34. Counter-bore 105 is closed at its upper end by plug closure member 106. The closure member 106 has a recessed inwardly displaced central portion forming a seat for the spring 107 that urges the ball member of check valve 108 against its associated seat formed in bore 105 between the upper larger portion and lower reduced diameter portion thereof.

A piston 110 is fixed to react against fixed support or base means 11 laterally thereof and opposite the open end of the second cylinder bore 100. Moreover, the piston 110 has a longitudinal or axial passage 111 extending therethrough to form a fluid supply connection to the hydraulic passageways discussed above. The piston is provided with an external flange 112 intermediate its ends of the piston and this flange serves as a means for affixing the piston to the fixed support means 11 or at least a reaction abutment cooperating with the fixed support means to prevent outward lateral movement of piston 110 from the position shown.

In the retracted position of the support means 12, the second piston 110 substantially abuts against the inner end of the bore 100, i.e., against the shoulder at the junction between passageways 100a and 100b. In this position, piston 110 effectively closes communication between the inlet bore or passageway 111 in piston 110 and the passageway 102, so that when fluid under pressure is applied at the inlet coupling 111a of the second piston, the same cannot pass to the first cylinder 34. The ball check valve 108 prevents direct communication through bore 105 between the inlet bore 111 and cylinder 34 since the pressure on the top or upstream side of the ball presses the ball tightly against its associated seat thereby maintaining the check valve closed.

Due to the lack of communication between the inlet bore 111 and chamber 34, the fluid under pressure being fed into the inlet bore reacts against the side wall of bore 105, and since the piston 110 is relatively fixed by flange 112 against the fixed support means, the moveable support means, rides outwardly, i.e., to the right as shown toward the thrust applying or extended position.

As the moveable support means 12 moves into its extended position, the second piston 110 comes into communication with the second annular groove or passageway 102. During such movement of the moveable support means, the same compresses the spring 18.

Once communication is opened between inlet bore 111 and passageway 102 the hydraulic fluid passes through the bore 104 and into first cylinder 34 reacting on the piston 40 to force the piston 40 downwardly or outwardly. With downward movement of piston 40, piston rod 46 moves downwardly thereby causing lever 27 to pivot about its fulcrum. In turn, the surface 30 engages the body 17 to apply the desired force or thrust thereto.

The release of the hydraulic pressure at the inlet coupling 111a at the outer end of the second piston 110, as in the previously described embodiment, permits the biasing spring 50 to return the piston 40 to its upper position and to force the fluid from above the piston 40 out through the check valve 108, axially of the piston 110 through bore 111 therein and to the inlet coupling 111a. When the main or first piston 40 reaches the end of its inward stroke under the action of the spring 50, it no longer exerts a pressure on the fluid above it, and the check valve 108 closes. The spring 18, thereafter acts to force the moveable support means towards its retracted position, and the excess hydraulic fluid between the inner end of the second piston 110 and the shoulder at the junction between passageways 100a and 100b is forced toward the inlet coupling 111a through the axial passage 111 in the second piston 110.

The advantage of the modification described immediately above lies in the simplicity of the hydraulic system in the moveable support means, which results in a quicker action as well as a reduced manufacturing cost.

A still further modification hereof is presented in FIGURES 5 through 8 inclusive. The moveable support means of this modification is shown in perspective in FIGURE 5. It will be noted that the same is provided with grooves 13 in the side faces thereof for mounting the moveable support in a fixed support 11 as explained above. The top surface of the moveable support means mounts a lever 27 fulcrumed on a cylindrical fulcrum member 201 that fits in complimentary cylindrical grooves in the lower surfaces of the lever and the upper surface 26 of the moveable support. The front or right hand surface 19 of the moveable support means is provided with the recess to retain the biasing spring means 18 as explained in connection with the embodiment of FIGURES 1 through 4. In this modification two springs 18 are provided at laterally spaced locations adjacent the sides of the support to provide the required return bias explained above. The top surfaces 26 of the moveable support means also mounts biasing springs 50 in recesses formed therein which recesses are complementary with like recesses in the underside of the lever 27 receiving the opposite ends of springs 50.

Aside from the duplication of springs and recesses, the above described features of this embodiment correspond to the general features of the embodiments previously described. In any embodiment, as should be apparent, the pistons and cooperating bores, passages, cylinders, and assemblies can be duplicated without departing from the invention.

Now, returning to the more significant aspects of the embodiment hereof presented in FIGURES 5 through 8, the interior of the support means 12 is formed with a large bottom bore 205 opening through the bottom surface of the support and directly communicating with a coxial smaller bore 214 opening through the central portion of the support into a counter bore 216. The counter bore 216 opens onto the top surface of the support 26 underlying the end of the fulcrumed lever member 27. The upper counter bore 216 is threaded, and receives a ring packing 216a in underlying relation to a packing gland ring plug 217.

A piston 206 is reciprocal in bore 205 and this piston has a stepped portion 207 which receives a packing ring 207a peripherally of the upper portion of the piston. The top of the piston is faced with a disc member 208 that holds the hydraulic packing ring 206a in its seat on the piston. A piston rod 209 is provided to connect piston 206 with lever 27. This rod has a reduced diameter lower threaded end that engages in a threaded bore in the piston 206. The rod 209 also has a shoulder that engages the disc member 208 to clamp on the packing ring 207a to thereby maintain the packing ring in position.

The upper end of the piston rod 209 extends through the intermediate bore 214 and through the packing 216a and packing nut 217, and then past the upper surface 26 of the moveable support. The upper end of the piston has an enlarged head 210, the lower surface of which is chambered as at 211 to form a pivot type bearing surface. The end of the lever 27 is step-recessed as at 202 and 203, to form shoulders 204 extending longi- tudinally of the lever 27 and engageable with the chambered lower surface of the enlarged head 210 (see FIGURE 5).

The hydraulic supply is connected through a flexible conduit means to a threaded inlet coupling 212 extending through the rear wall or surface of the moveable support means 12. This coupling is at the outer terminal end of a passage 213 which extends horizontally inwardly, as viewed in FIGURE 6, to connect with an annular groove or inner passageway 215, formed in the wall of the intermediate bore 214 extending vertically through the moveable suport means 12 and receiving piston rod 209.

The annular groove or inner passageway 215 communicates through a continuation of the horizontal passage 213 with a vertical counter-bore 218 extending from the top surface 26 of the support means 12 into the top end wall of the first or main piston cylinder 205. The counter-bore 218 is shouldered at 218a to form a seat 219 for a spring biased ball member of check valve 220. The counter-bore 218 is closed at its upper end by a closure plug member 221 which is centrally recessed to receive the biasing spring 222 which reacts between the plug closure member 221 and the ball of the check valve 220.

The anular groove or inner passageway 215 also communicates laterally (FIGURE 7) with a pair of horizontally disposed bores 230 that open through the rear surfaces of the moveable support means. These bores form a pair of second piston cylinders. The second cylinders are counterbored at 231 whereby the same have a reduced diameter inner end extention portions 231a. Intermediate the ends of the second cylinders and approximately centrally thereof, vertical passageway 232 connects the second cylinders 230 to the first cylinder 205.

A pair of pistons 233 are slidably received in respective bores 230. Each piston 233 is provided with an annular groove 234 intermediate its ends, and such groove receives a packing or sealing ring. Each piston moreover, has a reduced inner end adapted to slidably project into the associated reduced end portion 231a of its associated second cylinder 230. Still further each piston 233 has a threaded rear end 236, providing a means by which the piston can be easily fixed to the fixed support means 11. Accordingly, in this embodiment as in the embodiment of FIGURES 1 through 4, the pistons are connected to the fixed support means 11 and the moveable support means 12 moves relative thereto.

In the normal rest or retracted position of the moveable support means 12, the reduced forward ends 235 of the pair of second pistons project into the reduced inner extensions 231a of the second cylinders 231. Hydraulic fluid admitted under pressure through inlet coupling 212 and passing through bore 213 to the inner passageway 215 is distributed therefrom initially to act against the ends of the pistons 233 and exert an outward propelling force on the moveable support means 12. Specifically, at this time hydraulic fluid enters the second cylinders 230, and reacts between the fixed pistons 233 and the moveable support means resulting in the movement of the moveable support means 12 from the retracted position to its extended position. At the end of the motion of the moveable support means 12, toward its extended position, the pistons 233 uncover the vertical passageways 232 thereby establishing communication through the second cylinders 230 with the top portion of the first cylinder 205. Hydraulic fluid thereafter flows into the first cylinder 205 in the moveable support means and reacts against piston 206, and through rod 209 to cause the lever 27 to pivot about its fulcrum 201 and bring the surface 30 on the outer end thereof into contact with the body against which the force or thrust is to be applied.

When the force is no longer required, the hydraulic pressure is released at the inlet coupling 212, and the biasing springs 50 operate to return the lever 27 and moveable support means 12 to their position of rest or retracted positions in generally the same manner as the returning operation is carried out in the other embodiments hereof. The first piston 206 returning to its upper position under the action of the biasing springs 50, forces the hydraulic fluid from, the cylinder 205 through passageway or bore 218 past check valve 220 thereby establishing return flow through the inlet coupling 212. As the first piston 206 completes its return stroke, and no presure is exerted on the fluid thereby, the check valve 220 closes and the biasing springs 18 act to return the moveable support means 12 to its retracted position forcing the hydraulic fluid from the second cylinders 230 through the distribution inner passageway 215 and then out through the inlet coupling 212 to complete the cycle of operation. The biasing springs 18, being weaker than the biasing springs 50, cannot effect a movement of the moveable support means until the first piston ceases to provide a pressure in the hydraulic fluid.

FIGURE 9 discloses an additional embodiment of the present invention wherein a pair of pistons 206, operating through a pair of rods 209 on the lever 27 serve to provide the pivoting force. The individual structures of the first pistons and cylinders in this embodiment are the same as that shown for the single first cylinder and first piston in FIGURE 2 or 6. The cylinders are connected by a passageway 250 that extends transversely of the support, and vertical passages that communicate with the top portions of the first cylinders. Intermediate the ends of the transverse passage 250 is a threaded passage 251 which receives the end of the piston, such as piston 64 in FIGURE 2. The piston 64 and the cylinder 22 into which the piston 64 projects have a structure identical with that shown in FIGURE 2. The mode of operation is the same as that shown in FIGURE 2 and there appears no need to repeat the cycle of operation, the difference between the two embodiments being merely that two first pistons and cylinders are used in the operation of the lever 27 providing for higher forces and thrusts than can be achieved through the use of a single first piston and cylinder arrangement.

After reading the foregoing detailed description of the illustrative and preferred embodiments hereof, it will be appreciated that the objects set forth at the outset of this specification have been successfully achieved. Accordingly,

What is claimed is:

1. A force applying apparatus comprising a first support means, a second support means movably mounted with respect to said first support means, fulcrum means carried by said second support means, lever means pivotally mounted on said fulcrum means, first power actuated operating means including a piston operable in said second support means and operably coupled to said lever means for pivoting said lever means about said fulcrum means, second power actuated operating means reacting between said first and second support means to move said second support means from a retracted to an extended position relative to said first support means conduit means in said second support means for conducting a power fluid from an external source to said second power means, and means communicating said first and second power actuated operating means when said second support means has moved to said extended position to thereby operate said piston.

2. A force applying apparatus, as defined in claim 1, wherein said first power actuated operating means comprises a chamber in said second support means, said piston being reciprocally movable in said chamber, and a piston rod connecting said piston with said lever means for pivoting thereof when said second support means is in said extended position.

3. A force applying apparatus, as defined in claim 2, wherein said second support means has a bore extending from said chamber to the face of said second support means adjacent said lever means, said piston having a sleeve extension reciprocal in said bore sealing said chamber from said bore.

4. A force applying apparatus, as defined in claim 3, wherein said piston rod extends through said sleeve extension and carries enlarged heads at opposite ends thereof, wherein said piston and said lever means have sockets therein receiving said heads, and wherein the engaging faces of said sockets and said heads are complimentary in contour for sliding movement therebetween.

5. A force applying apparatus, as defined in claim 2, wherein said piston comprises a piston body having a peripheral recess, wherein a seal ring is disposed in said recess, and wherein said piston further comprises a sealing plate compressably mounted in overlying relation to said seal ring.

6. A force applying apparatus, as defined in claim 1, wherein said first power actuated operating means comprises a link member having an enlarged head means and wherein said lever means is recessed to receive said head means and an adjacent portion of said link member in sliding abutting actuating relation thereto.

7. A force applying apparatus, as defined in claim 1, wherein said first power actuated operating means comprises: a chamber in said second support means, said piston being reciprocally movable in said chamber said first power actuated means also comprising a piston rod and means coupling said piston rod with said lever means and with said piston, said coupling means comprising spherical sockets in said lever means and in said piston and spherically shaped enlarged heads on said piston rod engageable with said sockets.

8. An apparatus for applying a thrust relative to a base comprising:

support means movable between retracted and extended positions and supported by said base;

lever means pivotally supported on said support means for applying said thrust;

a first piston and cylinder means in said support means;

link means connecting said lever means and said first piston and cylinder means;

a second piston and cylinder means operable to move said support means between said retracted and extended positions;

a first passage means in said support means for conducting a power fluid from an external source to said second piston and cylinder means for propelling said support means towards said extended position;

a second passage means connected with said first passage means when said support means reaches said extended position for admitting fluid under pressure from said second piston and cylinder means to said first piston and cylinder means for actuating said lever means; and means operable when said pressure is released to return said lever and support means to their initial positions.

9. Apparatus as defined in claim 8 further comprising a check valve positioned between said first and second passages to permit one-way flow of fluid from said second passage means to said first passage means thereby allowing said first piston and cylinder means to resume its initial position.

10. An apparatus according to claim 8, wherein said second piston and cylinder means comprises;

a second cylinder formed in said support means;

a second piston connected to said base and projecting into said second cylinder; and said first and second passages comprise respectively;

a bore through said second piston connected with an inlet; and an annular groove in said second cylinder wall positioned to be uncovered by said second piston when said support means is in its extended position to admit fluid under pressure to said first piston and cylinder means.

11. Apparatus according to claim 8, wherein said second piston and cylinder means comprises;

a pair of second cylinders formed in said support means;
a pair of second pistons connected with said base and extending into said pair of second cylinders; and wherein said first and second passages comprise;
an inlet means in said support means communicating with the ends of said pair of second cylinders; and
a pair of ports through the walls of said second cylinders spaced from the end of the second cylinder to be uncovered when said support means is in its extended position to establish communication between said pair of second cylinders and said first piston and cylinder means.

12. Apparatus according to claim 8, wherein said first piston and cylinder means comprises;
a pair of first cylinders formed in said support means;
a pair of pistons reciprocally mounted therein; and wherein said link means comprises;
a pair of link members connecting said lever means and the last said pair of pistons.

13. Apparatus according to claim 1 wherein said lever means is provided with a bifurcated end forming spaced shoulders, and said piston is operatively coupled to said lever means by a piston rod extending from said piston and having a T-shaped head engaging said spaced shoulders.

14. A force applying apparatus, comprising a first support means, a second support means movably mounted thereon between retracted and extended positions, a lever pivotally supported on said second support means for applying a force, a first power means between said second support means and said lever to pivot the latter when said second support means is in said extended position, and second power means between said first and second support means comprising a piston secured to said second support means and a cylinder device on said first support means, said piston being movable in said cylinder device to move said second support means to an extended position and to control and supply operating fluid to said first power means for pivoting said lever.

15. A force applying apparatus as set forth in claim 14, wherein said cylinder device comprises a housing having a fluid inlet, a cylindrical bore in which the piston operates, two spaced openings in the wall of said cylindrical bore and a passageway in said housing connecting said two spaced openings a passageway in said piston, one of said openings being in communication with said fluid inlet and the other opening being in communication with said passageway when the second support means is in said extended position to supply operating fluid to said power means.

16. A force applying apparatus as set forth in claim 14, wherein said cylinder device comprises a housing having a bore in which said piston operates, a first passageway in said housing, a port opening in the walls of said housing defining said bore, a second passageway in said piston, a piston port opening to said second passageway said piston and the walls of said housing defining said bore having port to openings to provide a path of fluid flow from a supply line, through said first passageway in said housing, through said port opening in the walls of said housing defining said bore, through said piston port opening to said passageway in said piston to supply operating fluid to said first power means when said second support means is in said extended position.

17. A force applying apparatus as set forth in claim 14, wherein said piston has a passageway therein extending from either end and a wall in said piston forming a juncture between the two passageways of said piston, said wall having an opening, a valve seat formed about said opening a check valve for said valve seat operating in one of said piston passageways, said one piston passageway being in communication with a fluid suppply line, the other piston passageway being in communication with said first power means, said check valve being arranged to unseat from said valve seat when the pressure of operating fluid in said first power means exceeds the pressure in said fluid supply line to thereby conduct fluid from said first power means.

18. A force applying apparatus as set forth in claim 17, wherein said one piston passageway has a plug member therein, a spring in said one piston passageway between said plug member and said check valve to urge the latter towards the seat about the opening of said wall member.

19. A force applying apparatus as set forth in claim 17, wherein said one piston passageway has a plug member therein, said plug member having an opening to provide a path for fluid flow from said supply line, to said one piston passageway, to the opening in said plug member, to the cylinder device to thereby move the piston and the second support means to which the piston is connected to said extended position.

20. In a force applying apparatus, the combination comprising first support means, second support means thereon movable between extended and retracted positions, fulcrum means carried by said second support means, a lever pivotally mounted on said fulcrum means, first power means coupled between said second support means and said lever for pivoting the latter about said fulcrum means when said second support means is in said extended position second power means for moving said second support means to said extended position, conduit means in said second support means for conducting a power fluid from an external source to said second power means, said first power means comprising a power piston operable in said second support means, and link means slidably connected at one end portion to said lever and at the other end portion to said power piston.

21. In a force applying apparatus as set forth in claim 20, wherein said slidable connections are formed by providing spherical surfaces on the said end portions of the link means to engage mating spherical surfaces on said lever and said power piston.

22. In a force applying apparatus as set forth in claim 20, wherein said link means is connected to said lever and to said power piston by ball and socket connections.

References Cited by the Examiner
UNITED STATES PATENTS

| | | | |
|---|---|---|---|
| 13,783 | 11/1955 | Fouser | 254—126 |
| 1,024,173 | 4/1912 | Betts | 254—124 |
| 1,042,873 | 10/1912 | Betts | 254—124 |

WILLIAM FELDMAN, *Primary Examiner.*
MILTON S. MEHR, *Examiner.*